United States Patent
Gopalakrishnan et al.

(10) Patent No.: US 6,930,981 B2
(45) Date of Patent: Aug. 16, 2005

(54) METHOD FOR DATA RATE SELECTION IN A WIRELESS COMMUNICATION SYSTEM

(75) Inventors: Nandu Gopalakrishnan, Chatham, NJ (US); Srinivas R. Kadaba, Chatham, NJ (US); Farooq Ullah Khan, Manalapan, NJ (US); Sanjiv Nanda, Clarksburg, NJ (US); Mehmet Oguz Sunay, Istanbul (TR); Ganapathy Subramanian Sundaram, Scotch Plains, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 872 days.

(21) Appl. No.: 09/730,637

(22) Filed: Dec. 6, 2000

(65) Prior Publication Data

US 2002/0110101 A1 Aug. 15, 2002

(51) Int. Cl.[7] .............................................. H04B 7/216
(52) U.S. Cl. ....................... 370/252; 370/335; 370/342; 370/465
(58) Field of Search ................................ 370/209, 310, 370/342, 465, 252, 335; 375/146, 222; 455/422.1, 517

(56) References Cited

U.S. PATENT DOCUMENTS

| 5,912,907 A | * | 6/1999 | Stewart ...................... 714/774 |
|---|---|---|---|
| 5,914,950 A | * | 6/1999 | Tiedemann et al. ......... 370/348 |
| 5,920,552 A | * | 7/1999 | Allpress et al. ............. 370/335 |
| 5,960,003 A | * | 9/1999 | Fischer et al. .............. 370/468 |
| 6,088,578 A | * | 7/2000 | Manning et al. .............. 455/68 |
| 6,134,230 A | | 10/2000 | Olofsson et al. ............ 370/337 |
| 6,147,964 A | * | 11/2000 | Black et al. ................. 370/209 |
| 6,385,462 B1 | * | 5/2002 | Baum et al. ................. 455/522 |
| 6,421,541 B1 | * | 7/2002 | Karlsson et al. ............ 455/509 |
| 6,539,050 B1 | * | 3/2003 | Lee et al. .................... 375/146 |
| 6,539,205 B1 | * | 3/2003 | Wan et al. ................... 370/465 |
| 6,563,810 B1 | * | 5/2003 | Corazza ...................... 370/335 |
| 6,731,618 B1 | * | 5/2004 | Chung et al. ................ 370/328 |
| 6,741,861 B2 | * | 5/2004 | Bender et al. ............... 455/450 |
| 6,763,009 B1 | * | 7/2004 | Bedekar et al. ............. 370/335 |
| 6,859,446 B1 | * | 2/2005 | Gopalakrishnan et al. .. 370/335 |

FOREIGN PATENT DOCUMENTS

| WO | WO 98/35514 | 8/1998 | ............ H04Q/7/22 |
|---|---|---|---|
| WO | WO 00/07401 | 2/2000 | ............ H04Q/7/38 |

* cited by examiner

Primary Examiner—Min Jung

(57) ABSTRACT

Data rate determination is provided in a system where the available power fraction and available Walsh codes in each active leg are dynamically changing over time. This method adapts the rate (modulation and coding) based on the combined resource (power & code space) levels seen at each cell. The method results in maximization of the rate supportable by each cell given their resource constrained situation while meeting the constraints of target packet or frame error rate and orthogonality. Furthermore, improved fast cell selection by the mobile results due to this approach that is based on knowledge of combined resource (power & code space) levels across the cells in the active set.

20 Claims, 3 Drawing Sheets

$$W_1 = [+1]$$
$$W_2 = \begin{bmatrix} +1 & +1 \\ +1 & -1 \end{bmatrix}$$
$$W_{2n} = \begin{bmatrix} W_n & W_n \\ W_n & \overline{W_n} \end{bmatrix}$$

$$W_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

PL: | 2.4 kbps | 4.8 kbps | | 153.6 kbps | 192.0 kbps |

L: | 4.8 kbps | 9.6 kbps | | 153.6 kbps | 307.2 kbps |

WL: | 9.6 kbps | 19.2 kbps | | 491.5 kbps | 614.4 kbps |

METHOD FOR DATA RATE SELECTION IN A WIRELESS COMMUNICATION SYSTEM

BACKGROUND OF THE INVENTION

1. Field of the Invention

The present invention relates to communications; more specifically, wireless communications.

2. Description of the Related Art

In wireless communication systems such as Code Division Multiple Access (CDMA) systems the number of users that are supportable by a base station is limited by resources such as available transmit power and a number of orthogonal codes that are used to distinguish channels. In many CDMA systems the orthogonal codes are derived from a set of 16 orthogonal Walsh codes.

In CDMA systems that support both voice and data communications the power and code resources are shared between the voice and data users. Typically, each voice user is provided with one orthogonal code and sufficient transmit power to maintain an acceptable signal to noise ratio or frame error rate. The remaining transmit power and orthogonal codes are provided to one data user at a time on a time shared basis. As a result, for a short period of time, each data user receives all the remaining transmit power and orthogonal codes that are available after satisfying the requirements of the voice users.

Typically, a data rate provided to a data user is picked from a relatively large set of standardized data rates. The data rate provided to the data user is based on a signal quality measurement such as a carrier to interference ratio measured by the user's terminal. Since a relatively large set of standard rates are available, a relatively large number of overhead bits are required for the user's terminal to specify which of the standardized rates are to be used based on the carrier to interference ratio measured by the mobile unit. Using the large number of bits to specify the data rate is wasteful of limited signaling channel bandwidth.

In addition, older CDMA systems use carrier to interference ratios measured at a data user's mobile terminal to select base stations during handoff periods. Using carrier to interference ratios for base station selection during handoffs involving a data user may result in the user selecting a base station that does not provide the maximum overall data rate to that user.

In the data only evolution of the third generation CDMA standard (hereinafter referred to as 3G-1x EVDO), voice and data services are provided using separate frequency carriers. That is, the voice and data signals are transmitted over separate forward links defined by different frequency carriers. Data is transmitted over a time division multiplexed carrier at fixed data transmit powers but at variable data rates. To improve system throughput, the system allows the wireless unit with the best channel, and thereby the highest rate, to transmit ahead of wireless units with comparatively low channel quality. 3G-1x EVDO uses a fast rate adaptation mechanism whereby the wireless unit performs the rate calculation at every slot using measurements of a pilot signal broadcast from the base station and reports back the rate at which it is going to receive data from the base station at every slot.

The measured signal to interference ratio (SIR) at the receiver is used to determine a data rate which can be supported by the receiver. Typically, the determined data rate corresponds to a maximum data rate at which a minimum level of quality of service can be achieved at the access terminal. Higher measured SIR translates into higher data rates, wherein higher data rates involve higher order modulation than lower data rates.

The simplified Forward Traffic Channel structure in a 3G-1x EVDO system is shown in FIG. 1. The sequences of modulation symbols after modulation repetition/puncturing is demultiplexed to form 16 pairs (in-phase and quadrature) of parallel streams. Each of the parallel streams is covered with a distinct 16-ary Walsh function at a chip rate to yield Walsh symbols at 76.8 ksps. The Walsh-coded symbols of all the streams are summed together to form a single in-phase stream and a single quadrature stream at chip rates of 1.2288 Mcps.

In a 3G-1x EVDO, the modulation, coding and the number of Walsh codes is fixed for a given data rate and is known by the access terminal and the base station. The data rate predictor in a 3G-1x EVDO system takes measured SIR, modulation and coding parameters for all the rates, and the frame error rate (FER) target as inputs and outputs the supportable data rate (see FIG. 2).

Another evolution of the third generation CDMA standard called 1xEV-DV support circuit-switched voice and data as well as packet-switched high-speed data on the same 1.25 MHz spectrum. The support of packet-switched high speed data users is provided by means of a new, shared channel that serves one packet data user at a time in a time-multiplexed manner (similar to 1xEV-DO). The Walsh codes are dynamically shared between circuit-switched services and packet services. Therefore, the number of codes available for data change dynamically due to circuit switched call arrivals and call departures.

The shared packet data channel is defined based on the use of a multitude of fixed spreading factor codes e.g. spreading factor SF=16. The number of codes of SF=16 that are available for the shared packet data channel would vary depending on the codes being used by the dedicated channel users. The same is true of the base station transmitter power available for the shared channel. The values of available transmit power as a fraction of the total and the available code space are broadcast on a newly defined channel enabling the UE to make a better estimate of the supportable rate (or C/I).

The simplified Forward Traffic Channel structure in a 3G-1x EVDV system is shown in FIG. 3. Each one of the parallel streams of the forward channel is covered with a distinct 16-ary/32-ary/64-ary/128-ary Walsh function at a chip rate to yield Walsh symbols at 76.8 ksps/38.4 ksps/19.2 ksps/9.6 ksps. The Walsh-coded symbols of all the streams are summed together to form a single in-phase stream and a single quadrature stream at chip rates of 1.2288 Mcps.

SUMMARY OF THE INVENTION

The number of bits used to specify a standard data rate from a set of standardized data rates is reduced by using subsets of a larger set of standardized data rates. By using subsets containing a smaller number of standardized data rates, less bits are required to identify a data rate within the subset and thereby more efficiently use the bandwidth of a signaling channel. The subsets of standardized rates are based on the available transmit power available to a data user and/or the number of orthogonal codes available to a data user. The mobile data unit is informed of the available transmit power and the number of Walsh codes available by the base station using a forward link signaling channel. The mobile unit identifies a subset of standardized data rates using the available power and available Walsh code information received on the forward link. Based on a signal quality measurement such as carrier to interference ratio, the mobile unit selects a standardized data rate from the subset of standardized rates. The mobile then communicates its data rate selection using the reduced number of bits and thereby more-efficiently uses the bandwidth of the reverse link signaling channel.

When a data user's terminal is in a handoff situation, it selects a base station to receive the handoff based on the base station that provides the highest overall data rate. The mobile unit receives available transmit power and the number of available orthogonal codes from each of the candidate handoff base stations from the forward link signaling channels of each base station. The mobile unit also measures a signal quality such as a carrier to interference ratio associated with each candidate base station. The mobile unit identifies a subset or group of data rates associated with each candidate base station using the available power and available orthogonal code information, and then identifiers a standardized data rate within each subset or group for each candidate base station based on the measured carrier to interference ratios. The mobile unit then requests a handoff to the base station that will provide the highest overall data rate. For example, the standardized data rates may be provided on a per orthogonal code or per channel basis. The mobile unit then selects the base station that will provide the highest data rate using the rate identified within a subset multiplied by the number of orthogonal codes or channels that are available from the base station.

In the 3G-1x EVDV system, the coding and modulation supportable in each active leg cell needs to be varied as the available power fraction and the number of available Walsh codes for data changes. This is to maximize the information transmission rate possible at the desired packet or frame error rate and subject to the orthogonality constraint that the symbol rate at the output of the Walsh summer is equal to the chip rate (e.g. 1.2288 Mc/s). Conversely, a rate determination algorithm that does not take into account the dynamically varying power fraction and number of Walsh codes available in each active leg cell will fail to reasonably compute the optimal data rate supportable per cell. Furthermore, algorithms that ignore the dynamically varying power fraction and number of Walsh codes that are available in each active leg cell will fail in helping the mobile select the best cell in the sense of obtaining maximum supportable multi-code rate.

The present invention provides a method for data rate determination in a system where the available power fraction and available Walsh codes in each active leg are dynamically changing over time. This method adapts the rate (modulation and coding) based on the combined resource (power & code space) levels seen at each cell. The method results in maximization of the rate supportable by each cell given their resource constrained situation while meeting the constraints of target packet or frame error rate and orthogonality. Furthermore, improved fast cell selection by the mobile results due to this approach that is based on knowledge of combined resource (power & code space) levels across the cells in the active set. One of the names for this proposed solution is Resource Adaptive Modulation and Coding & Fast Cell Selection with the acronym RAMC/FCS.

DETAILED DESCRIPTION

Walsh codes have the distinctive property that higher Walsh space codes can be derived from the lower Walsh space codes.

Figure 1:
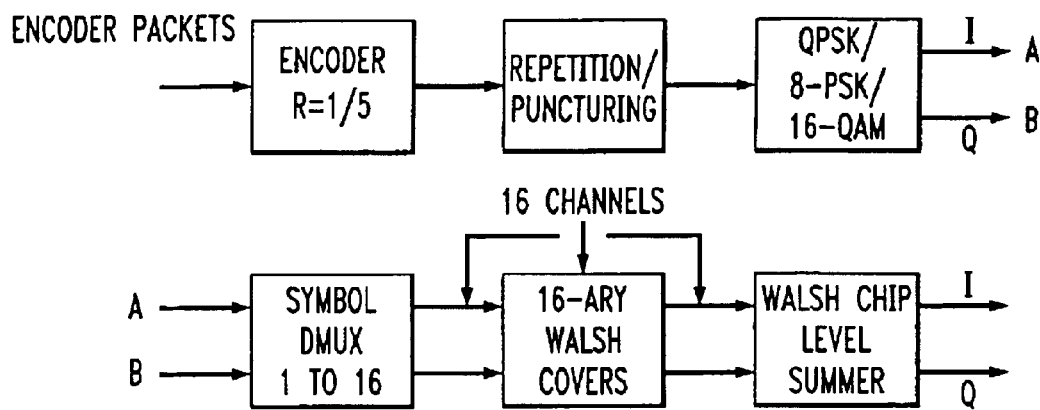
FIG. 1 illustrates a forward traffic channel structure.
Figure 2:
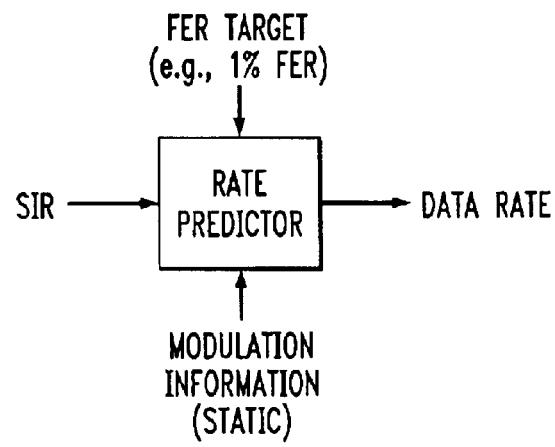
FIG. 2 illustrates a rate predictor.
Figure 3:
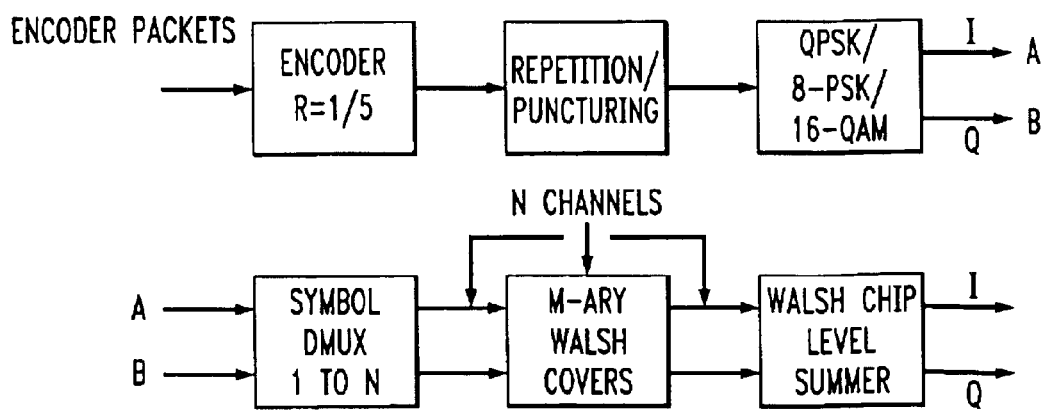
FIG. 3 illustrates a forward traffic channel structure.
Figures 4, 5, 6:
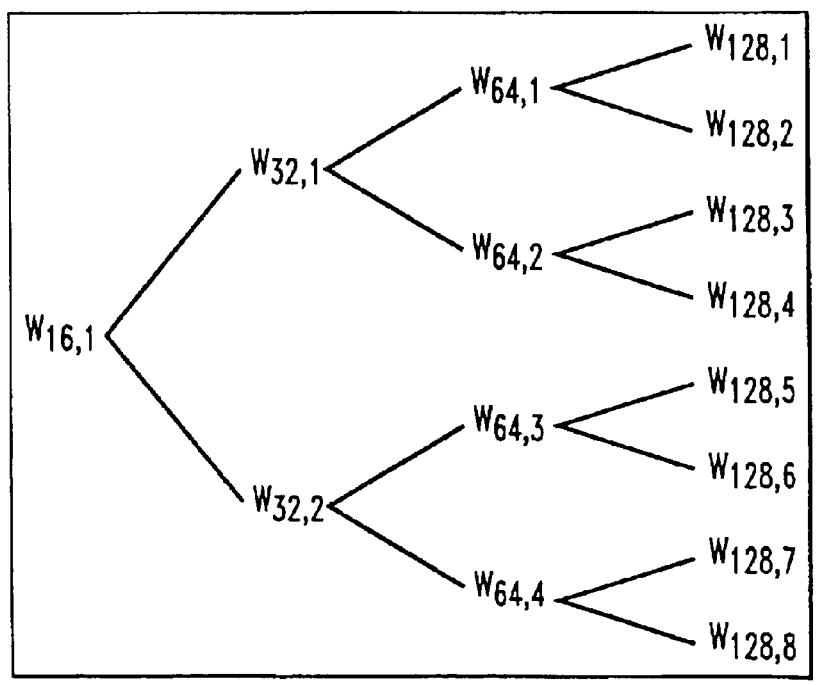
FIG. 4 illustrates Walsh matrices.
FIG. 5 illustrates a Walsh matrix of order 4.
FIG. 6 illustrates the derivation paths for different Walsh spaces.

FIG. 4 illustrates a Walsh matrix of order 1 and order 2, and a Walsh matrix of order $2n$. The rows of the matrix are the Walsh codes composing the Walsh space. The relationship between a Walsh matrix of order n and order $2n$ is a recursive relationship and is used to easily produce larger order Walsh matrices. For example, in creating a Walsh matrix of order 4, the Walsh matrix of order 2 is inserted into the upper left hand corner, the upper right hand corner, and the lower left hand corner of the Walsh matrix of order 4. The bar version of the Walsh matrix of order 2 is inserted into the lower right hand corner of the Walsh matrix of order 4. The bar version of the matrix is formed by taking the logical inverse of each element of the matrix. FIG. 5 illustrates a Walsh matrix of order 4.

Orthogonality across codes from different spaces is possible as long as two codes that are in the same derivation path are not selected simultaneously. Consider FIG. 6. Here, a code from the Walsh space of Walsh-16 is used to derive two codes from the Walsh space of Walsh-32. Likewise, each Walsh code from the Walsh-32 space is used to create two codes from the Walsh-64 space and so on. In the figure $W_{x,y}$ represents the y'th Walsh code form the Walsh space of Walsh-x. Now, from the figure, one can see that, for example, while $W_{32,1}$ and $W_{64,3}$ are orthogonal, $W_{32,1}$ and $W_{64,2}$ are not.

When assigning code space to mode one users, such as voice users, and assigning other code space to mode two users, such as data users, it is desirable to divide the codes in large blocks that originate from a lower order Walsh code such as a 16 symbol code. By assigning the subspaces in groups originating from lower order Walsh codes, a receiver's design is simplified by requiring fewer decoding paths to receive transmissions. For example, in a system using 128 symbol Walsh codes, it is desirable to assign the codes to the subspaces in groups of 8 consecutive codes so that a receiver would only need 16 decoding paths to receive transmissions.

The relation between data rate, modulation coding parameters and the chip rate can be written as:

$$R_{data} = mR_{coding} R_{chip}\left(\frac{NW^i}{i}\right)A[Kb/s]$$

Where, m=modulation order, 2, 3, or 4 for QPSK, 8-PSK, and 16-QAM respectively.

$R_{coding}$: the effective coding rate after encoding followed by puncturing/repetition.

$R_{chip}$: chip rate (e.g., 1228.8 Kcps).

$NW^i$: number of i-ary Walsh codes available for data.

A the multiple antenna MIMO factor; A=1 with single antenna, 2 with 2×2 BLAST etc.

For example, at an effective coding rate of ½, 16-QAM modulation and eight $W^{16}$ codes available for data, the maximum data rate with 2×2 BLAST is 2457.6 Kb/s. With just one $W^{16}$ available, for the same case, the maximum data rate possible reduces to 307.2 Kb/s that will be called as the maximum rate per code under these assumptions.

Note that as the number of available Walsh codes reduces, the system has to use either higher order modulations (large m) or higher coding rates (weaker codes) in order to achieve a given data rate. In general, the higher order modulations and weaker codes require larger values of $E_b/N_o$ to achieve a given PER or FER target. Therefore, for a given FER target, the supportable data rate is not only a function of the available SNR but also the available Walsh codes. These factors combine to determine the modulation and coding parameters and thus the data rate. The available SNR can be expressed as a product of two terms, the first being the pilot Ec/Nt referenced to a constant pilot fraction that is simply a function of the channel conditions. The second term is the available power fraction (more precisely the ratio of shared channel power to pilot power) which dynamically varies due to the dedicated power controlled (circuit voice) users' loading. Note that, for a given data rate, the number of chips per information bit (called the processing gain) remains unchanged as the number of available Walsh codes varies. But the true performance is a function of the modulation, coding and spreading which have different performance tradeoffs.

As the power and number of Walsh codes available for the downlink shared packet channel varies with time in a cell, the mobiles in that cell experience different contexts i.e., relative level of limitation in the Power domain and Code domain (which in general is a non-linear relationship). Based on the mobile being aware of the context it can signal a selected rate (modulation and coding) per code wherein the parameters of spreading, modulation and coding (i.e. puncturing/repetition) is a function of the current available resource combination or context. The relative levels of the power and code space resource determine different contexts and for each context, an optimized set of rates per code (i.e. spreading, modulation and coding schemes) can be defined. The following detailed example is used to illustrate this invention.

DESCRIPTIVE EXAMPLE

In the following table 1, we will use a single threshold, such as 50% of the available code power or space, that demarcates each resource (power and code space) as either high or low. Depending on the combination of these resources, the contexts are defined as Linear (L), Walsh limited (WL) and power limited (PL).

TABLE 1

| RESOURCE COMBINATION | Codes HIGH | Codes LOW |
|---|---|---|
| Power HIGH | L | WL |
| Power LOW | PL | L |

In the linear (L) region, the code space (bandwidth) and power resources in the cell decrease in direct proportion to each other. For example, they could both have high values (16 W of power and 16 codes) or can both have low values (1 W of power and 1 code) or intermediate values (2W of power and 2 codes). In all cases, the rate per code of a user with a certain fixed channel condition will nearly be a constant since the power available per code in both cases is unity. Of course, the net multi-code rate will be 16 times larger in the former case than in the latter. In any event, the rate per code of a user when the cell is in the linear region is determined mainly as a function of the channel conditions only (i.e. pilot Ec/Nt).

We assume as an example that these channel conditions (pilot Ec/Nts) are binned into a discrete set of 16 rates (or modulation and coding schemes) per code signaled by four bits. The actual net rate of a certain user will be the product of the rate (modulation and coding scheme) per code and the number of codes available. Since the number of codes available is the same for all users in the cell, scheduling will be based on the rate per code reported by each user selecting that cell.

When the cell is in the Walsh limited (WL) region, there is very little room for bandwidth expansion but plenty of excess power available. Thus the rate per code signaled by users in the cell is likely to be uniformly greater than the corresponding rates per code the same users experiencing the same channel conditions would have signaled, assuming the same set of modulation and coding schemes used in the linear region. However, the far in excess power available may permit the selection of even weaker codes (higher code rates due to heavier puncturing) and higher order modulations in general, because of the sufficient SNR per bit available. This results in the creation of a new rate set (modulation and coding set) wherein all the rates per code of the same set of users in the cell are further staggered towards the higher side compared to linear (L) for the same FER.

For example, we may have 2 W of power left but with only one $W^{16}$ code left. This means the power available per code compared to linear is a 3 dB gain. In such a context, nearly uncoded transmission (rate ⅘ or 1 instead of say rate ½) may be possible for users with very good pilot Ec/Nt resulting in the maximum rate per $W^{16}$ code (see example from last section) to approach 614.4 kbps.

Here again (in WL), scheduling is based on the rate per code from this new set reported by each user. The actual net rate of a certain user will be the product of the rate (modulation and coding scheme) per code and the number of codes available. This altered choice of the rate set (by altering the modulation and coding choices) provides sufficient granularity to distinguish between users while scheduling. In other words, it allows for efficient use of all the bits (eg. four) in reverse link rate (modulation and coding) per code feedback.

The following table 2 summarizes the rate set contexts using the above example. In this particular example, a user with very good channel conditions is assumed. In all three contexts, the corresponding rate (per code) is signaled using the same highest rate message bits by the mobile (eg. 1111).

TABLE 2

| RESOURCE COMBINATION | 16-ary Codes 2 | 16-ary Codes 1 |
|---|---|---|
| Power 2 W | L (307.2 per code, 614.4 net) | WL (~614.2 per code, ~614.4 net) |
| Power 1 W | PL (>153.6 per code, >307.2 net) | L (307.2 per code, 307.2 net) |

On the other hand, when the cell is Power limited (PL) then there is very little available transmitter power for the data users but plenty of code space available. Thus the rates per code signaled by users in the cell is likely to be uniformly smaller than the corresponding rates per code the same users experiencing the same channel conditions would have signaled, assuming the same set of modulation and coding schemes used in the linear region. However, the far in excess Walsh code space available permits aggressive bandwidth expansion by the selection of very strong codes (low code rates due to reduced puncturing and possible repetition) for a given order modulation. The coding gain thus provided will partially make up for the SNR loss due to the high power consumption by circuit (e.g. voice) users. Therefore, the staggering of all the rates per code towards the lower side compared to linear (L) will be reduced for the same FER.

For example, we may have only 1 W of power left but as many as 2 $W^{16}$ codes left. This means the power per code compared to linear is a 3 dB loss. Thus if the lowest rate per code for the linear case was 4800 bps assuming rate k/n coding, then the user with the channel that was capable of 4800 bps in the linear case cannot support any rate fromm the same rate set in this PL example. But in such a PL context, the rate k/n transmission of the earlier example may be stengthened to rate k/2n by combining the two 16-ary Walsh codes into an 8-ary Walsh code with reduce spreading if they were on the same code tree branch. This way 4800 bps transmission is possible on a single 8-ary Walsh code, and orthogonality with other users is still maintained. In fact, due to the choice of stronger coding over spreading, it is likely that there is a FER improvement as well. When combined with HARQ, this implies an effective rate quite likely larger than expected in the linear case.

In general, the improved coding may recoup some or all of the rate loss that this user may have to suffer if he was forced to pick a modulation and coding rate from the original linear set. Thus the user in this example gets away with 4800 bps rate with decent FER due to stronger coding as opposed to zero rate that the linear case would have forced.

A second option can be considered when the two available W16s are not branches of a common W8 code. In such cases, a 2400 bps lowest rate per code is defined for the PL case with rate k/2n coding and same 16-ary spreading factor as linear. The rate k/2n code is preferably designed as a stronger code or if that is not feasible, then block repetition of the output of the same rate k/n coder used in the linear case would suffice. A net rate of 4800 bps is then achieved via multi-coded transmission with two $W^{16}$ codes.

In this example, when the mobile selects the lowest rate configuration (eg. signaled as 0000 in the four bit field of a reverse rate message), the option selected viz. single 8-ary code vs. two 16-ary codes is implicitly communicated to the base without additional overhead. This is so because both the base and mobile are aware of the structure of the Walsh code space via bitmap signaling from base to mobile on the broadcast channel. In both options, the rate per code can be thought of as 2400 bps.

Here again (PL), scheduling is based on the rate per code selected from this new set for PL reported by each user. This altered choice of the rate set (by altering the spreading, modulation and coding choices) provides sufficient granularity to distinguish between users while scheduling. In other words, it allows for efficient use of all the bits (eg. four) in reverse link rate (modulation and coding) per code feedback.

The new definitions of the rate (per code) sets for the PL or WL contexts that is contrasted against the linear rate (per code) set are all accomplished in a pre-determined manner based on pre-determined thresholds used to demarcate linear, WL and PL situations. In our example, the thresholds used were: greater than +3 dB transmit power per 16-ary Walsh code referenced to linear for WL and lesser than −3 dB transmit power per 16-ary Walsh code referenced to linear for PL. These pre-determined definitions implicitly known to the mobile and base ensure transparent operation of the mobile rate determination and avoid the need for any additional signaling (other than the broadcast of the available resources) of new rate formats from the base to the mobiles.

The following table 3, summarizes the rate set contexts using the above example. In all three contexts, the corresponding rate (per code) is signaled using the same lowest rate message bits by the mobile (eg. 0000)

TABLE 3

| RESOURCE COMBINATION | 16-ary Codes 2 | 16-ary Codes 1 |
| --- | --- | --- |
| Power 2 W | L (4.8 per code, 9.6 net) | WL (9.6 per code, 9.6 net) |
| Power 1 W | PL (2.4 per code, >4.8 net) | L (4.8 per code, 4.8 net) |

Figures 7, 8:
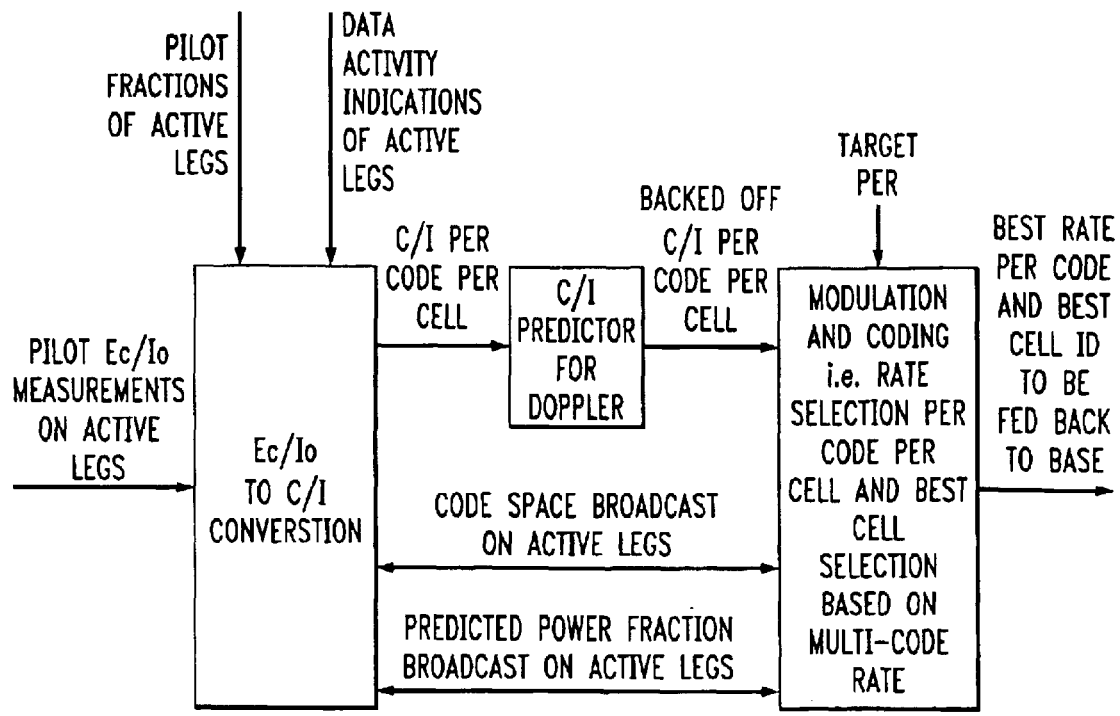
FIG. 7 illustrates different rate code sets.
FIG. 8 is a block diagram of the proposed rate and best cell determination method.

As an example, the following FIG. 7 indicates and contrasts the different rate (per code) sets one could define for the different contexts of L, WL and PL:

The above example was discussed by limiting attention to a single threshold (and hence two regions, high or low) each in the power domain and code space domain. With two regions, the number of rate set definitions or contexts equals three (i.e., L, PL and WL). In general with N-1 thresholds and N regions each for power and code domains, it can be shown that the number of contexts equals 2N-1 (i.e. L and various shades of PL and WL). Thus the number of contexts increases only linearly and not as a square with the increased granularity of thresholding. The following table 4, illustrates the 2N-1 banded contexts in the table. In this example N=5 yielding 9 contexts, with the linear context left unshaded along the main diagonal.

TABLE 4

Block Diagram for RAMC/FCS

The block diagram of the proposed rate and best cell determination algorithm or method is shown in FIG. 8. The Ec/Io to C/I conversion block takes the measured pilot Ec/Io on all legs, their respective pilot fractions, power fractions, code spaces and data activity indicators of the present and near term to yield a time varying C/I per code for each cell (see section regarding Calculation of Effective C/I). The C/I predictor block (as in 1x EVDO system) smooths this time varying value and backs off to a conservative estimate to guarantee performance against Doppler variations over round trip delay plus transmission time. Finally, the main rate and best cell determining block examines this backed off C/I per code per cell together with the power fraction and code space available on all legs to compute the optimal rate (spreading, modulation and coding) per code per cell subject to meeting the FER target. It also decides that cell which maximizes the net multi-coded rate. The best rate per code and the corresponding best cell id are fed back by the mobile to the base in the allocated fields on the reverse link rate feedback channel.

An example of coding and modulation required for different number of Walsh codes to achieve a data rate of 614.4 Kb/s is shown in table 5. Note that SNR required in order to provide 614.4 Kb/s at a given FER target (e.g., 1% FER) will be different in the four cases shown in this example.

TABLE 5

| Number of W16 | Coding Rate | Modulation Type | SNR |
|---|---|---|---|
| 2 | 0.5 | 16-QAM | SNR(4) |
| 4 | 0.5 | QPSK | SNR(8) |
| 6 | 0.33 | QPSK | SNR(12) |
| 8 | 0.25 | QPSK | SNR(16) |

Alternative Embodiment

In the above described embodiment, explicit feedback of the supportable rate (modulation and coding) from the mobile is preferred over sending Signal to Interference Ratio (SIR, C/I or pilot Ec/Io) measurements to the base station. It is preferable that the mobile compute the supportable rate (modulation and coding) for the following reasons:

Resource Adaptive Modulation and Coding (RAMC): The mobile can read the available resources (power fraction and channelization code space) left over from satisfying dedicated channel user load on all active legs. This information can be used in conjunction with the C/I measurements in determining the modulation and coding scheme or rate per code that best matches the target packet or frame error rate constraint. Thus the selection of the rate (modulation and coding) supportable by each cell is sensitive to the context of available resources of power and code space at that cell and can thus be maximized for throughput.

Accurate & Fast Cell-site Selection (FCS): During fast cell site selection, the mobile selects the best cell among the active legs for its downlink transmission every transmission time interval. Selecting the best cell based purely on signal strength or SIR measurement when the mobile is unaware of the loading in the surrounding cells can result in selecting a cell that is heavily loaded. The proposed downlink broadcast of power fraction and code space on all active legs can result in much improved cell selection by the mobile among other functions. In these downlink broadcast channels, both the available base station transmitter power fraction and its available channelization code space are sent. The mobile can read these available resources left over from satisfying dedicated channel user load on all active legs. This information can be used by the mobile to determine the best multi-code rate (by aggregating the rate per code per cell as above and taking the maximum) and the corresponding best serving cell during fast cell selection.

Interference Estimation and Scheduling: Mobiles with low geometries are usually dominated by other cell interference especially arising from active set members. Data activity indication will help reduce the unpredictability or variance in interference. The mobile can read the available power fraction to decipher the used up power fraction and current and near-term shared channel activity on all active legs, as well as measure the path losses and finger information from each of these active legs. It can use this information (see appendix A) in estimating the total expected interference accurately. This permits a more accurate determination of the C/I and therefore the rate (modulation and coding) that is important for the performance and fair scheduling of cell edge mobiles that are dominated by interferers. On the other hand, poor link quality estimation leads to poor scheduling and poor performance when scheduled. The downlink shared channel data activity indication is combined with power fraction information and broadcast to all mobiles.

Interference Cancelation Receivers: The mobile can measure the matrix channel quality and can use this information to map directly to a rate (modulation and coding) that can be supported when multiple antenna transmission and reception with interference cancelation (MIMO) is employed.

The broadcast channel for power fraction is recommended to be a physical code channel since the available power resource is expected to be fast changing. The downlink shared channel data activity indication bit is clubbed together with the power fraction information on the same channel broadcast at the same periodicity. However the broadcast channel for code space can be either a physical code channel or an upper layer message passed to the mobile on an appropriate common control channel depending on how fast and periodically the available code space is changing. These broadcast channels, in terms of overhead must be contrasted against the explicit rate (modulation and coding) and possibly the code space indication field on the downlink required by the alternative manifestations proposed below.

If the resources (power fraction and codespace) available to the mobile on all active legs are broadcast along with the shared channel activity indications, then the mobile can just as well select the modulation and coding (rate) since it possesses all the necessary information for the task.

Alternative 2: If the explicit feedback of rate is not preferred by the system designer for whatever reason, then the best modulation and coding (rate) based on the available resources (RAMC) can still be determined at the selected serving cell. In such a case, the mobile measures the C/I across all active leg cells and feeds back to the selected serving cell the corresponding maximum C/I value after duly accounting for the available power and interference from all active leg cells. However, such a cell selection performed by the mobile will not be influenced by the number of available codes nor the resource combination sensitive selection of the modulation and coding and will hence be sub-optimal (i.e. selected cell may not necessarily offer the best rate). Furthermore, in this manifestation an explicit rate (modulation and coding) indication field on a downlink control channel is needed as an additional overhead.

Alternative 3: If the broadcast channels are not used at all, then the mobile simply feeds back the pilot channel Ec/Io (Ec/Nt) that is a function of channel conditions only together with the corresponding cell that was received with the best pilot energy. This method of cell selection will not take into account the resource availability at the selected cell nor the advantage offered by the resource combination sensitive modulation and coding scheme. Furthermore, in this manifestation an explicit rate (modulation and coding) indication field as well as code space signaling on downlink control channels are still needed as overhead. Of course, the best modulation and coding (rate) dependent on the available resource combination (RAMC) can still be determined at the selected serving cell although a cell so selected may not necessarily be the best from a rate perspective. In this manifestation, a way of addressing the varying resource consumption issue could be through exclusion from the mobile's active set all those candidate cells that are highly loaded. This way of active set management is slow because of the upper layer messaging used to signal to the mobile such a limited active set. Furthermore, this method being based on ad-hoc high vs. low load affords very little granularity in cell selection. Also high loading is not due to a large number of users alone. Transmit activity factor variations on dedicated and shared channels and power control variations cause significant local variations in the resource. If we do not consider these as well as the rate limitation imposed by limited number of spreading codes, then the cell selection is neither optimal nor fast.

Computation of Effective C/I from Pilot Ec/Io Measurements and other Information This section describes the Ec/Io to C/I conversion block in the block diagram for rate determination (FIG. 8).

We assume a three Finger RAKE Demodulator at the data mobile m. The calculations can be extended without much difficulty for RAKE receivers with more fingers. We further assume interference limited scenario and ignore thermal noise from these calculations.

Case I

Two fingers assigned by the data mobile m to multipath rays from serving cell 1 to recover energy and one finger assigned to neighboring cell 2 to decode control information:

Ec/Nt (1,m,k)

multi-path channel between the serving cell 1 and the data mobile m.

$Io/E_{c1}^{sum}$ is the reciprocal of the sum locked finger Ec/Io measurement performed by the mobile m to estimate the multi-path channel from serving cell 1 to itself. The Io value is obtained by measuring the total power in the downlink in-band waveform projected onto the Walsh Subspace D2

D2 corresponds to the Walsh domain available for multi-coded data transmission on the serving cell's packet data channel and is signaled to the mobile.

The Ec/Nt in the above expression is divided by M where M is the number of W-ary (e.g. W=16) Walsh codes available in D2. This yields the desired C/I per code for the cell 1.

The equation A1 is derived in the following manner:

The numerators of the two summed fractions (by maximal ratio combining) are related to the energy expected to be collected in the future on the two taps of the RAKE. Each of the denominators express the sum of the future other cell interference and same cell interference (self +multiple access) due to loss of orthogonality. The other cell interference term in the denominator is the first term within {} and further enclosed in [] prior to scaling. It is expressed as the difference between total interference energy collected and the usable energy and further subtracting the same cell (self+multiple access) interference. It is then scaled appropriately to reflect future loading. The second term added inside the {} represents the same cell interference component.

EQUATION A1

$$Ec/Nt(1, m, k)$$

$$= \frac{(Eb/Nt)}{PG} \cdot$$

$$= \frac{\varsigma_1^d(k+d) \cdot (c_1/(c_1+c_2))}{\left\{\left[\varphi_1 \cdot (I_0/E_{c1}^{sum}) - \Psi_1^d(k) - (\varsigma_1^d(k) + \varsigma_1^{vo}(k)) \cdot \frac{(1-c_1)}{(c_1+c_2)}\right] \cdot \frac{(c_2^d(k+d) + \varsigma_2^{vo}(k+d))}{(\varsigma_2^d(k) + \varsigma_2^{vo}(k))} + \frac{(1-c_1)}{(c_1+c_2) \cdot (\varsigma_1^d(k) + \varsigma_1^{vo}(k))}\right\}} +$$

$$= \frac{\varsigma_1^d(k+d) \cdot (c_2/(c_1+c_2))}{\left\{\left[\varphi_1 \cdot (Io/E_{c1}^{sum}) - \Psi_1^d(k) - (\varsigma_1^d(k) + \varsigma_1^{vo}(k)) \cdot \frac{(1-c_2)}{(c_1+c_2)}\right] \cdot \frac{(\varsigma_2^d(k+d) + \varsigma_2^{vo}(k+d))}{(\varsigma_2^d(k) + \varsigma_2^{vo}(k))} + \frac{(1-c_2)}{(c_1+c_2) \cdot (\varsigma_1^d(k) + \varsigma_1^{vo}(k))}\right\}}$$

where:

k is the instant of measurement, i.e when the reverse feedback rate per code and antenna information (RAI) is computed k+d is the instant of prediction, i.e. time of data reception; d is approximately three slots (3.75 ms).

$\varsigma_j^d$ is the traffic power fraction allocated to TDM packet data channel in cell j.

$\varsigma_j^{vo}$ is the voice+overhead power fraction allocated to the CDM channels in cell j.

$\Psi_j^d$ is the indicator function of the forward data activity of cell j; valued at 1 while ON & 0 while OFF.

$\phi_j$ is the pilot fraction allocated to continuous pilot in cell j.

$c_j$ are the normalized magnitude squared channel tap coefficients (fraction of energy recovered) estimated for the After the Ec/Nt (C/I) per code per cell is computed, the corresponding RAI can be looked up from link level simulation result tables for AWGN following suitable backoffs for prediction error. The Gaussian assumption for the snapshot channel (quasi-static) holds if the channel fades sufficiently slowly for the channel coefficients to remain constant and stable during the time between measurement to prediction (if not the channel coefficients must be averaged over an appropriately weighted window).

Case II

One finger assigned to a ray from serving cell 1 to recover energy and two fingers assigned to neighboring cells 2 and 3 respectively to decode control information.

EQUATION A2

$$Ec/Nt(1,m,k)$$
$$= \frac{(Eb/Nt)}{PG} \cdot$$
$$= \frac{\varsigma_1^d(k+d) \cdot}{\left\{\left[\varphi_1 \cdot (Io/E_{cl}^{sum}) - \Psi_1^d(k) - (\varsigma_1^d(k) + \varsigma_1^{vo}(k)) \cdot \frac{(1-c_1)}{c_1}\right] \cdot \left[\frac{(c_2^d(k+d) + \varsigma_2^{vo}(k+d))}{(\varsigma_2^d(k) + \varsigma_2^{vo}(k))} \frac{\beta_2}{(\beta_2+\beta_3)} + \frac{(c_3^d(k+d) + \varsigma_3^{vo}(k+d))\beta_3}{(\varsigma_3^d(k) + \varsigma_3^{vo}(k))(\beta_2+\beta_3)}\right] + \frac{(1-c_1)}{c_1 \cdot (\varsigma_1^d(k) + \varsigma_1^{vo}(k))}\right\}}$$

where, in addition:

$\beta_j$ is the ratio of path losses to the mobile of neighbor cell j to serving cell 1. This is estimated as the ratio of the pilot energy of cell j to that of cell 1 assuming equal pilot power fractions.

The Ec/Nt in the above expression is divided by M where M is the number of W-ary (e.g. W=16) Walsh codes available in D2. This yields the desired C/I per code for the cell 1.

The invention claimed is:

1. A method for determining communication rates, comprising the steps of:
   identifying a set of possible communication rates based on an amount of transmit power available for communications; and
   identifying a communication rate based on a received signal quality.

2. A method for determining communication rates, comprising the steps of:
   identifying a set of possible communication rates based on a number of available communication channels; and
   identifying a communication rate based on a received signal quality.

3. The method of claim 2, wherein the communication channels are defined by Walsh codes.

4. A method for determining communication rates, comprising the steps of:
   identifying a set of possible communication rates based on an amount of transmit power available for communications and a number of available communication channels; and
   identifying a communication rate based on a received signal quality.

5. The method of claim 4 wherein the communication channels are defined by Walsh codes.

6. A method for determining communication rates at a mobile station communicating with a base station, the method comprising:
   identifying a set of possible communication rates based on an amount of transmit power available for communications at said mobile station; and
   identifying a communication rate based on a received signal quality at said mobile station.

7. A method, as set forth in claim 6, further comprising:
   receiving information about the amount of transmit power available from said base station at said mobile station.

8. A method, as set forth in claim 6, further comprising:
   receiving information about a number of available communication channels from said base station at said mobile station.

9. A method, as set forth in claim 6, wherein identifying a communication rate further comprising:
   selecting a standardized data rate from a subset of standardized data rates of a plurality of subsets of a larger set of standardized data rates at said mobile station.

10. A method, as set forth in claim 9, further comprising:
    communicating the standardized data rate selection to said base station using at least one less bit than required to identify a data rate within said plurality of subsets of a larger set of standardized data rates.

11. A method, as set forth in claim 6, wherein identifying a communication rate further comprising:
    identifying at said mobile station a subset of standardized data rates; and
    receiving information about the amount of transmit power available and one or more available Walsh codes on a forward link signaling channel from said base station at said mobile station.

12. A method, as set forth in claim 6, further comprising:
    selecting in a handoff situation, a particular base station from a multiplicity of base stations to receive the handoff based on a base station that provides a highest overall data rate.

13. A method, as set forth in claim 12, further comprising;
    receiving information about an available transmit power and a number of available orthogonal codes from each of the candidate handoff base stations of said multiplicity of base stations a corresponding forward link signaling channel of each base station at said mobile station.

14. A method, as set forth in claim 13, further comprising:
    measuring a signal quality associated with each of the candidate handoff base stations.

15. A method, as set forth in claim 14, further comprising:
    identifying a group of data rates associated with each of the candidate handoff base stations based on the available transmit power information and the number of available orthogonal codes information.

16. A method, as set forth in claim 15, further comprising:
    measuring a carrier to interference ratio for each of the candidate handoff base stations; and
    identifying a standardized data rate within each group of data rates for each of the candidate handoff base stations based on the measured carrier to interference ratios of the candidate handoff base stations.

17. A method, as set forth in claim 16, further comprising:
    requesting a handoff to the particular base station that provides the highest overall data rate.

18. A method, as set forth in claim 6, further comprising:

determining a level of an available transmit power and a number of available Walsh codes across an active set of cells.

19. A method, as set forth in claim 18, further comprising:

adapting a modulation and coding rare based on the level of the available transmit power and the number of available Walsh codes indicated at each cell of said active set of cells.

20. A method, as set forth in claim 19, further comprising:

selecting a cell at said mobile station by maximizing the modulation and coding rate supportable by each cell of said active set of cells.

\* \* \* \* \*